C. W. HAMMOND.
BURNISHING MACHINE.
APPLICATION FILED DEC. 4, 1909.

990,258.

Patented Apr. 25, 1911.
3 SHEETS—SHEET 2.

Witnesses:
H. G. Barrett
E. Behel.

Inventor:
C. W. Hammond
By A. O. Behel
Atty.

C. W. HAMMOND.
BURNISHING MACHINE.
APPLICATION FILED DEC. 4, 1909.
990,258.
Patented Apr. 25, 1911.
3 SHEETS—SHEET 3.
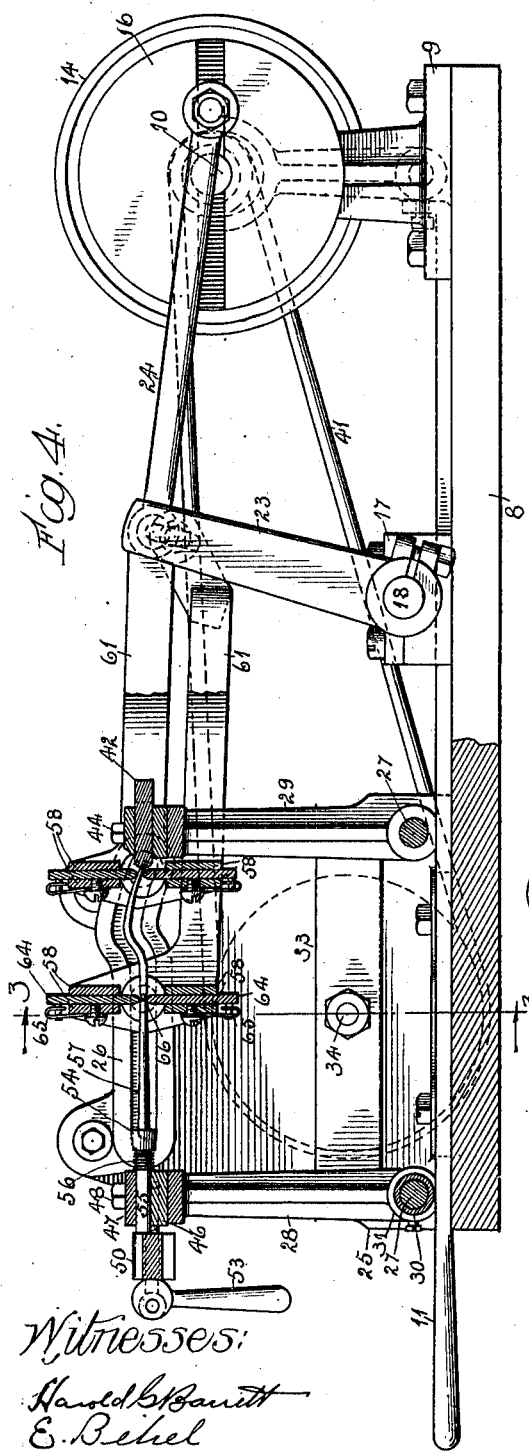
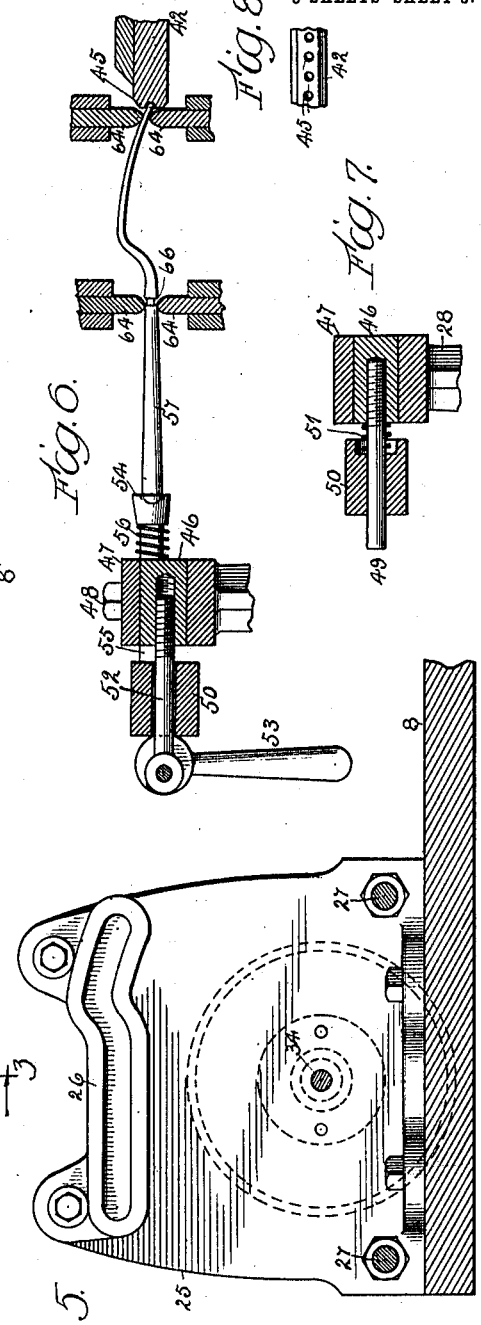
Witnesses:
Harold G. Barritt
E. Beliel
Inventor:
C. W. Hammond
By A. O. Beliel
Atty.

UNITED STATES PATENT OFFICE.

CHRISTOPHER W. HAMMOND, OF ROCKFORD, ILLINOIS, ASSIGNOR TO ROCKFORD SILVER PLATE COMPANY, OF ROCKFORD, ILLINOIS, A CORPORATION OF ILLINOIS.

BURNISHING-MACHINE.

990,258.  Specification of Letters Patent.  Patented Apr. 25, 1911.

Application filed December 4, 1909. Serial No. 531,440.

*To all whom it may concern:*

Be it known that I, CHRISTOPHER W. HAMMOND, a citizen of the United States, residing at Rockford, in the county of Winnebago and State of Illinois, have invented certain new and useful Improvements in Burnishing-Machines, of which the following is a specification.

The object of this invention is to construct a machine for burnishing the handles and tines of forks.

Figure 1:
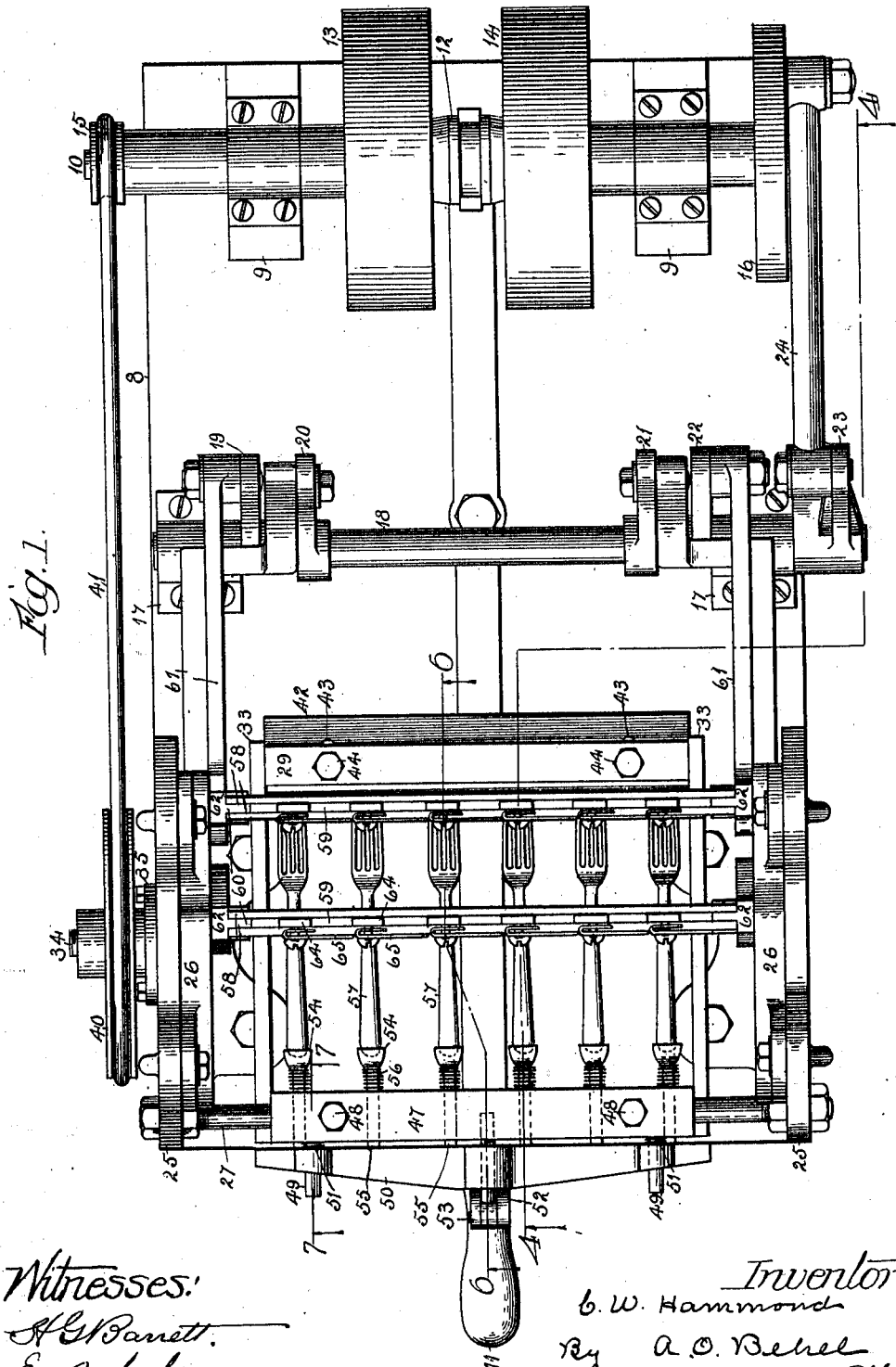
Figure 2:
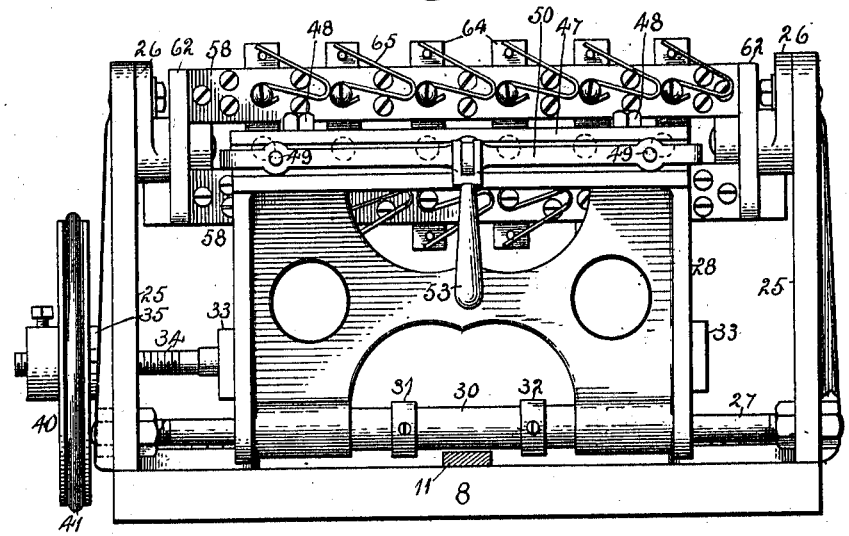
Figure 3:
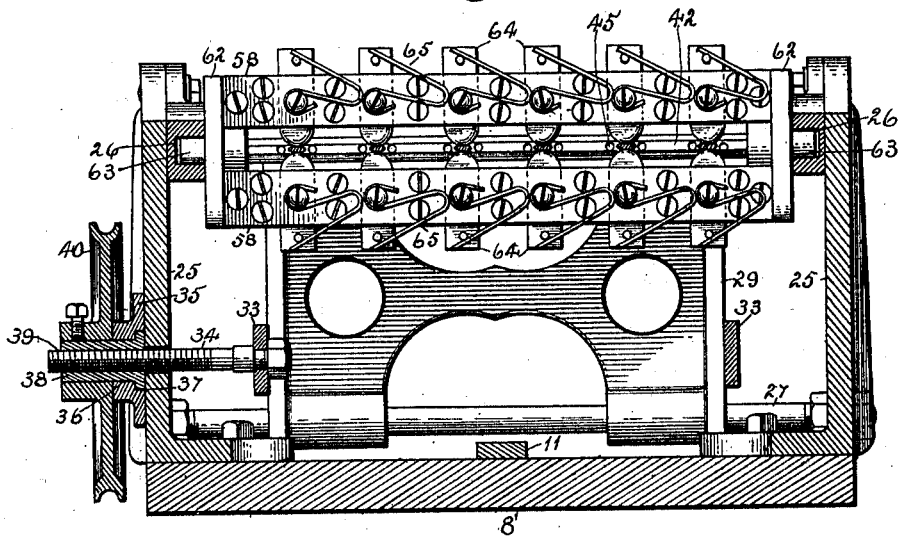

In the accompanying drawings, Figure 1 is a plan view of my improved burnisher. Fig. 2 is an elevation as seen from the feed end. Fig. 3 is a transverse section on dotted line 3 3 Fig. 4. Fig. 4 is a lengthwise vertical section on dotted line 4 4 Fig. 1. Fig. 5 is an inner face representation of one of the guide-ways. Fig. 6 is a lengthwise vertical section on dotted line 6 6 Fig. 1. Fig. 7 is a section on dotted line 7 7 Fig. 1. Fig. 8 is a face representation of the bar.

The operative parts are mounted on a base plate 8. Two bearings 9 are supported by this base plate and these bearings support a shaft 10 to which is splined a slidable clutch section 12. This clutch section is moved by the shipping lever 11. The shaft 10 supports two pulleys 13 and 14 which are intended to be driven in opposite directions by belt connections with a suitable motive power. As the clutch section is moved into engagement alternately with the pulleys 13 and 14, the shaft will receive a rotary motion in opposite directions. To one end of this shaft 10 is secured a grooved faced pulley 15, and to the other end of this shaft is secured a crank head 16.

Two bearings 17 are secured to the base plate 8 and a shaft 18 is supported thereby. To this shaft are secured five arms 19, 20, 21, 22 and 23. A link 24 has one end connected to the arm 23, and its other end is connected to the crank-head. As the crank-head is rotated, a rocking action will be imparted to the shaft 18, and the arms 19, 20, 21, and 22.

To the base plate are secured two end plates 25 and to the upper ends of these end-plates are secured guide-ways 26 having the outline of a table fork. Two rods 27 are connected with the end plates 25. Frames 28 and 29 are supported by the rods 27 and are capable of sliding thereon.

The frame 28 has a tube 30 through which the rod 27 passes, and two collars 31 and 32 have an adjustable connection with this tube in order that they may be spaced different distances. These frames 28 and 29 are connected by the end bars 33, in order that they may move together. The means for moving these frames comprises a screw-threaded rod 34 which has a fixed connection with one of the end bars 33. To one of the end plates 25 is secured an extension 35 provided with a central opening 36 and having one end provided with an enlargement 37.

A bushing 38 is fitted within the opening 36 and enlargement 37, and has a screw-threaded opening 39 which receives the screw-threaded rod 34. To the projecting end of the bushing 38 is secured a grooved-faced pulley 40. A belt 41 connects the grooved-faced pulleys 15 and 40, through which motion is imparted to the pulley 40 from the shaft 10.

As the screw-rod 34 is held against rotary movement, but is capable of a bodily lengthwise movement, and the bushing 38 is capable of a rotary movement, but is held against lengthwise bodily movement, the rotation of this bushing will move the screw-rod 34 bodily in a lengthwise direction which will move the frames 28 and 29 on the rods 27. When the frames have moved a given distance in either direction, the collars 31 and 32 will contact with shipping lever 11 and move it, thereby disengaging the clutch section from either of the pulleys 13 and 14, and stop the movement of the frames. By moving the shipping lever farther in the same direction in which it was moved by one of the collars, the clutch section will be moved into engagement with the other of the pulleys 13 or 14, thereby forming a driving connection with the shaft 10, and cause it to rotate in the opposite direction, which will move the frames 28 and 29 in the opposite direction, until the other collar, contacting with the shipping lever, moves and disengages the clutch section and stops the movement of the frames.

The frame 29 supports a bar 42, which is made adjustable by means of the slots 43, and clamping bolts 44. One edge of the bar 42 is formed with depressions 45.

The frame 28 supports two bars 46 and 47 which are held in place by the bolts 48. Two studs 49 have a screw-threaded connection with the bar 46, and a bar 50 is supported by the projecting ends of these studs.

A spring 51 surrounds each stud and is located between the bars 46 and 50, its action being to hold the bars separated. A rod 52 has a screw-threaded connection with the bar 46 and passes through the bar 50. An eccentric lever 53 has a pivotal connection with the rod, and bears against the bar 50. This eccentric lever forces the bar 50 toward the bar 46, against the action of the springs 51.

A plurality of fork holding receptacles 54 have their shank portions 55 located in openings formed transversely of the bar 46. Springs 56 surround these receptacles, and are located between the edge of the bar 47 and the heads of the receptacles. The action of these springs is to hold the receptacles yieldingly outward.

Forks 57 have their handle ends located in the recesses in the receptacles, and their tines are located in the depressions 45 formed in the bar 42. By moving the lever 53 the eccentric portion thereof will contact with the bar 50 and force it inward, and when in its innermost position will contact with the ends of the shanks 55 of the receptacles thereby clamping the forks in position.

Two burnishing supporting frames are employed and are of like construction, and each comprises two heads, each composed of two bars 58 held separated by spacing blocks 59 and the projections 60 extending from the end bars 62. The heads are held separated and located one above the other. From each of the end bars 62 extends a bar 61. From each of the end bars 62 also extends a stud 63 which is located in the track way 26. These bars 61 have pivotal connections with the arms 19, 20, 21 and 22. Each of the heads support a plurality of burnishers 64 in a manner to permit the burnishers to slide lengthwise. The burnishers of one head are located opposite the burnishers of the other head, and a spring 65 for each burnisher serves to hold them yieldingly in contact. The contacting ends of the burnishers are rounded. As the shaft 10 is rotated, the heads will be moved bodily along the track-ways 26.

As the movement of the burnishers is only in the lengthwise direction of the fork, it is necessary that the forks move laterally in order that the burnishers may contact with all portions of the fork, and the springs 65 allow for the varying thicknesses of the handle and tines of the forks. One of the burnisher supporting frames has a movement sufficient to travel from the points of the tines of the fork to the flute 66, and the burnishers of the other frame travel from this flute to the end of the handle.

The track-ways 26 conform to the outline of the fork as near as possible, but the springs 65 acting on the burnishers will allow the burnishers to adapt themselves to any inequalities and varying thicknesses of the fork.

I claim as my invention.

1. A burnishing machine comprising a base, two track-ways having the outlines of a table fork, two sets of burnishers guided in the track-ways, one set for the handle portion of the fork and the other set for the tine end of the fork, means for moving the burnishers along the fork and a holder for the forks.

2. A burnishing machine, comprising a base, two trackways having the outlines of a table fork, two frames having guides located in different portions of the track-ways, burnishers supported by each frame, common means for moving both frames, and a holder for the forks.

3. In a burnishing machine, the combination with article holding means, of separate burnishers for operating on different portions of an article held by the means, a rock shaft having crank arms, separate link connections between the crank arms and the respective burnishers, and tracks for guiding the burnishers in different paths of movement, certain portions of the tracks that guide one of the burnishers being curved.

4. In a burnishing machine, the combination with a work holder, comprising spaced bars, one of which is provided with article receiving depressions, of article-engaging plungers slidably mounted in the other bar, springs engaging the plungers for urging them toward the bar having the depressions, a clamping bar slidably mounted on the bar having the plungers and being movable into and out of engagement with the plungers, springs for urging the clamping bar out of such engagement, and a cam for moving the bar into engagement with the plungers.

In testimony whereof I have hereunto set my hand in presence of two subscribing witnesses.

CHRISTOPHER W. HAMMOND.

Witnesses:
A. O. BEHEL,
E. D. E. N. BEHEL.

---

Copies of this patent may be obtained for five cents each, by addressing the "Commissioner of Patents, Washington, D. C."